United States Patent Office 3,776,862
Patented Dec. 4, 1973

3,776,862
CYCLIC ETHER POLYMERIZATION PROCESS
John Boor, Jr., El Cerrito, Calif., assignor to Shell Oil Company, Houston, Tex.
No Drawing. Filed Nov. 4, 1971, Ser. No. 195,837
Int. Cl. C08g 23/14
U.S. Cl. 260—2 A     5 Claims

ABSTRACT OF THE DISCLOSURE

Cyclic ethers are polymerized to polyethers, at a temperature between about 50° C. and about 160° C., in the presence of a catalyst comprising the reaction product of (1) an inorganic compound of a metal from Groups II, IIIa, IV, and VIb, of the periodic system having at least one bond from said metal to oxygen or sulfur, (2) a primary or secondary amine containing up to 18 carbon atoms and (3) a dialkyl zinc compound.

BACKGROUND OF THE INVENTION

The invention relates to a new process for the preparation of polyether homopolymers and copolymers. More particularly, the invention relates to polymerizing cyclic ethers using a novel and very active catalyst system. The invention further relates to novel polymerization catalysts and to a method for preparing them.

The polymerization of cyclic ethers such as alkylene oxides is well known and is discussed, e.g., by J. Furukawa and T. Saegusa, Polymerization of Aldehydes and Oxides, Interscience Publishers, New York (1963), and by A. E. Gurgilio, Reviews in Macromolecular Chemistry, 1(1), pp. 39–190 (1966).

Generally it is known that it becomes especially difficult to polymerize cyclic ethers as the number of carbon atoms per molecule increases and particularly the polymerization of alkylene oxides which have two substituents on one carbon atom such as, e.g., isobutylene oxide to high molecular weight has been considered very difficult.

STATEMENT OF THE INVENTION

A new process has now been found for the preparation of high molecular weight polyethers with a novel catalyst system, which catalyst is very active for difficultly polymerizable cyclic ethers such as isobutylene oxide.

According to the invention, polyether homopolymers and/or copolymers are prepared by a process which comprises polymerizing at least one cyclic ether at a temperature between about 50 and 160° C. with a catalyst formed upon reaction: (1) an inorganic compound containing a metal selected from Groups II, IIIa, IV, and VIb of the periodic table having at least one bond from said metal to a Group VIa element selected from oxygen or sulfur, (2) a primary or secondary amine containing up to 18 carbon atoms, and (3) a dialkyl compound of the formula $R_1$—Zn—$R_2$ wherein $R_1$ and $R_2$ represent lower alkyl groups.

DESCRIPTION OF THE PREFERRED EMBODIMENTS

The cyclic ethers suitably employed for the preparation of the polyether homopolymers and copolymers according to the invention are those of the formula

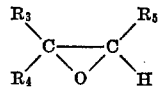

wherein $R_3$, $R_4$ and $R_5$ each individually represent a hydrogen atom or a hydrocarbyl group which may contain a halogen atom or a hydrocarbyloxy group as a substituent, and in which $R_3$ and $R_5$ may be linked together to form a cycloaliphatic ring. Preferred monomers are cyclic ethers which are hydrocarbyl mono-1,2-epoxides containing up to about nine carbon atoms, and more preferably 2 to 8 carbon atoms. Exemplary are ethylene oxide, propylene oxide, butylene oxide, isobutylene oxide, lower alkyl glycidyl ethers, allyl glycidyl ether, the aryl glycidyl ethers such as phenyl glycidyl ether, styrene oxide, cyclopentene oxide, cyclohexene oxide, butadiene monoxide, vinyl glycidyl ether, vinyl cyclohexane monoxide and the like. The cyclic ethers are preferably alkylene oxides of 2 to 6 carbon atoms, particularly ethylene oxide, propylene oxide, isobutylene oxide, cyclopentene oxide, cyclohexene oxide and mixtures of these. It is especially preferred to employ monomer mixtures wherein isobutylene oxide amounts to at least 50 mole percent (percent m), particularly at least about 75% m of the total quantity of monomer.

The catalyst according to the invention is prepared by reacting (1) an inorganic compound containing a metal selected from Groups II, IIIa, IV, and VIb of the periodic system having at least one bond from said metal to oxygen or sulfur, (2) a primary or secondary amine containing up to 18 carbon atoms, and (3) a dialkyl compound of the formula $R_1$—Zn—$R_2$ wherein $R_1$ and $R_2$ represent lower alkyl groups. The periodic system herein refers to the Periodic Table of Elements, "Handbook of Chemistry and Physics," Chemical Rubber Co., 50th ed. (1969), p. B–3.

Although catalyst systems employing inorganic compounds, of metals having an atomic number between 12 and 42, have been employed in the practice of this invention, generally it is preferred to employ inorganic compounds wherein the metal has an atomic number between 12 and 30. Examples of representative metals are magnesium, aluminum, silicon, calcium, titanium, zinc, zirconium and molybdenum. Among the Group II metals zinc and magnesium are most preferred. Among the Group IIIa metals aluminum is most preferred. Among the Group IV metals silicon is most preferred. Among the Group VI metals molybdenum is most preferred.

Examples of the inorganic compounds are magnesium compounds such as magnesium oxide, magnesium sulfide, magnesium hydroxychloride; zinc compounds such as zinc oxide, zinc sulfide; aluminum compounds such as aluminum oxide, aluminum sulfide; aluminum silicates; silicon compounds such as silicas, silica-aluminas and silicates such as magnesium silicate; molybdenum compounds such as molybdenum oxide and molybdates such as zinc molybdate; titanium compounds such as zinc titanate; zirconium compounds such as zinc zirconate and the like. Particularly preferred are oxides and sulfides of zinc, magnesium and aluminum.

Preferably, the solid inorganic compound is in particulate, i.e., finely divided form. Advantageously, the inorganic solid will have a surface area of at least about 5 square meters per gram, solids having a surface area in the range between about 20 and 600 square meters per gram being preferred. Preferably, the finely divided inorganic solid will pass through a screen of 400 mesh.

Component (2) is a primary or secondary amine containing up to 18 carbon atoms, amines containing up to 12 carbon atoms being preferred. Examples of component (2) are methylamine, ethylamine, isopropylamine, n-butylamine, pentylamine, hexylamine, cyclohexylamine, methyl cyclohexylamine, diethylamine, dibutylamine, methylpropylamine, methylbutylamine, ethylbutylamine, dicyclohexylamine, aniline, N,N'-dimethylaniline, α-naphthylamine, β-naphthylamine, p-ethylaniline, benzylamine, N-ethylaniline, α-phenylallylaniline, β-phenylethylamine and dicyclohexylamine. Cyclic monoamines such as cyclohexylamine are preferred.

The dialkyl compounds which are used in the present invention are organozinc compounds having the general formulat $R_1$—Zn—$R_2$ wherein $R_1$ and $R_2$ represent lower alkyl radicals, i.e., alkyl radicals of up to 6 carbon atoms.

Exemplary are dimethyl zinc, diethyl zinc, ethyl propyl zinc, di-n-propyl zinc, di-isopropyl zinc, di-n-butyl zinc, di-isobutyl zinc, ethyl isobutyl zinc, di-n-butyl zinc, di-isobutyl zinc, ethyl isobutyl zinc and mixtures thereof. Dialkyl zinc compounds wherein the alkyl groups each contain 2 to 4 carbon atoms are preferred. Diethyl zinc is most preferred.

During the reaction between (1), (2) and (3) the molar ratio is preferably between 1:0.002:0.02 and 1:0.6:1. Particularly preferred ratios of said inorganic compound:said amine:said dialkyl compound are from 1:0.01:0.04 to 1.0:0.5:0.8.

The preferred temperature for this reaction is between about 0° C. and 200° C. The solid catalyst may conveniently be prepared in the presence or absence of a diluent. Diluents which can be used include ethers such as dialkyl, aryl or cycloalkyl ethers; glycols such as ethylene glycol; aliphatic or cycloaliphatic hydrocarbons such as hexane, cyclohexane, heptane or methyl cyclohexane; and aromatic hydrocarbons such as benzene, toluene, xylenes, and mixtures of these.

It is recommended that the catalyst according to the invention be aged at least for thirty minutes, preferably from about 1 to 24 hours, at an elevated temperature, e.g., in the range from about 25–110° C. prior to polymerization of the cyclic ether, temperatures from about 70–100° C. being preferred.

In the polymerization process according to the invention the catalyst is usually employed in quantities from about 0.01 to about 5 mols per mole of monomer, amounts from about 0.2 to about 0.5 being preferred.

The temperature at which the cyclic ethers are polymerized will ordinarily be in the range from about 50° C. to about 160° C., preferably from about 70° C. to 140° C. Polymerization preferably takes place with the exclusion of oxygen and moisture.

Advantageously, the process according to the invention produces high molecular weight products having a reduced specific viscosity of at least about 0.5, preferably at least about 1 dl./g. Reduced specific viscosity has been determined in accordance with the following equation:

$$RSV = \eta_{sp.}/C$$

$\eta_{sp.}$ may be determined by dividing the flow time in a capillary viscometer of a dilute solution of the polymer by the flow time for the pure solvent. The concentration (C) used in the examples is 0.3 gram of polymer per deciliter (dl.) of solution.

The high molecular weight polymers obtained in the process according to the invention are rubbers or plastic materials as will depend upon the monomers and ratio of monomers employed. Rubbery products are, for example, homopolymers of epichlorohydrin, propylene oxide and butadiene monoxide as well as copolymers consisting of structured units derived from propylene oxide together with minor amounts of, e.g., ethylene oxide. The rubbery products may be vulcanized, if desired, for example, by means of peroxides.

It is a particular advantage of the process according to the invention that it permits preparation of high molecular weight homopolymers and copolymers of isobutylene oxide which are suitable for thermoplastic applications such as moldings, fibers and films.

The invention is further illustrated by the following examples.

In the following examples the bottles used as reaction vessels were previously dried and purged with nitrogen. The monomer was dried with molecular sieves and then distilled from calcium hydride about one hour before each experiment. Solvents were purified as follows: toluene was washed with sulfuric acid, sodium carbonate solution and distilled water, then passed through silica gel, mixed with calcium hydride, filtered, distilled from fresh calcium hydride and finally was stored under a nitrogen atmosphere and in the presence of calcium hydride. Heptane was passed through silica gel, distilled from calcium hydride and stored in the manner described for toluene. At the termination of a polymerization the products were added to methanol containing 5% w. hydrochloric or glacial acetic acid; the mixture was allowed to stand overnight and then filtered, followed by drying in under vacuum at 60° C. The reduced specific viscosities (RSV) values shown were determined at a concentration of 0.3 gram of polymer per 100 cc. O'-dichlorobenzene at 150° C. containing 0.3% by weight of $\beta$-naphthylamine inhibitor. In the following examples all volumetric amounts are at room temperature, i.e., about 23° C.

EXAMPLE I (A) Into an eight ounce bottle were added 1 gram of finely divided zinc oxide, 10 cc. of toluene and 2.2 millimoles (mmoles) of cyclohexylamine and 7 mmoles of diethyl zinc. The molar ratio of inorganic compound: maine:dialkyl compound was 1:.18:.58. This catalyst mixture according to the invention was aged 5 hours at 25° C. followed by the addition of 16 grams of isobutylene oxide. After polymerization for 66 hours at 70° C. the polymeric product having an RSV of 3.8 dl./g. was recovered in 20% yield.

(B) For purposes of comparison the procedure was repeated except that a somewhat larger amount of toluene (25 cc.) was added and the catalyst was aged for a lesser time (2 hours) at a higher temperature (75° C.). The polymer conversion was virtually the same, 21%.

EXAMPLE II

For comparison a catalyst not according to the invention was employed. The procedure of Example I(B) was repeated except that the amine component was omitted. No measurable polymer was formed.

EXAMPLE III

The procedure of Example I(B) was repeated except that the catalyst was aged for 17 hours at 75° C. The polymer conversion after 66 hours at 70° C. was increased by about one-third to 28%.

EXAMPLE IV

Into an eight ounce bottle were added 10.3 mmoles of finely divided zinc sulfide, 10 cc. of toluene, 1.1 mmoles of cyclohexylamine and 7 mmoles of dialkyl zinc. The molar ratio of inorganic compound:amine:dialkyl compound was 1:0.1:0.7. This catalyst according to the invention was aged four hours at 25° C. Sixteen and one-half grams of isobutylene oxide were added and polymerized for 66 hours at 70° C. The polymeric product was recovered in 24% yield.

EXAMPLE V (A) The procedure of Example IV was repeated except that the amount of amine component of the catalyst was increased to 2.2 mmoles, resulting in a molar ratio of the catalyst according to the invention of 1:0.2:0.7. The powdery white polyisobutylene product which had an RSV of 2.0 was recovered in 32% yield.

(B) The above procedure was repeated except that the amount of amine component was increased still further to 4.4 mmoles. This catalyst of the invention had a molar ratio of inorganic compound:amine:dialkyl compound of 1:0.4:0.7. After polymerization of isobutylene oxide for 66 hours the conversion was 38%.

If the above procedure is substantially repeated with mixtures of propylene oxide and isobutylene oxide monomers and the following catalysts magnesium silicate+N,N'-diethyl aniline+diethyl zinc
silica+α-naphthylamine+ethylpropyl zinc
silica-alumina+methylamine+diisopyropyl zinc
alumina+diethylamine+diethyl zinc it is expected that high molecular weight copolymers will be obtained.

EXAMPLE VI

The procedure of Example IV was repeated except that the inorganic compound, zinc sulfide, was replaced with 0.1 gram of finely divided zinc titanate. The resulting polyisobutylene oxide which had an RSV of 7.2 was recovered in 23% yield.

EXAMPLE VII

The procedure of Example IV was repeated except that in place of the zinc sulfide 1 gram mmole of zinc zirconate was used. The resulting polymer of isobutylene oxide had an RSV of 3.4 dl./g. and was recovered in 24% yield.

EXAMPLE VIII

For purposes of comparison the polymerization of isobutylene oxide was attempted employing catalysts not according to the invention. Into a series of eight ounce bottles were added 1 gram of several finely divided inorganic metal compounds as shown in Table I, followed by 15 cc. of toluene and 4.3 mmoles of cyclohexylamine. These mixtures were each aged by heating for one hour at 50° C. followed by the addition of 8.2 grams of isobutylene oxide. As shown in the table, no polymer was obtained when the dialkyl component was omitted.

TABLE I

| Experiment | Catalyst | Polymer conversion after 66 hours at 70° C. |
|---|---|---|
|  | Inorganic compound 1 gram— |  |
| 8a | Zinc oxide plus 4.3 millimoles cyclohexylamine | 0 |
| 8b | Zinc sulfide plus 4.3 millimoles cyclohexylamine | 0 |
| 8c | Zinc molybdate plus 4.3 millimoles cyclohexylamine | 0 |
| 8d | Zinc titanate plus 4.3 millimoles cyclohexylamine | 0 |

I claim as my invention:

1. A process which comprises polymerizing at a temperature between about 50° C. and about 160° C. at least one alkylene oxide of 2 to 6 carbon atoms in the presence of a catalyst formed by reacting (1) an inorganic compound selected from oxides and sulfides of zinc and aluminum, (2) cyclohexylamine and (3) diethyl zinc in a mole ratio of inorganic compound to amine to diethyl zinc between 1.0:0.002:0.02 and 1:0.6:1.

2. A process which comprises polymerizing at a temperature between 70° C. and 140° C. at least one alkylene oxide of 2 to 6 carbon atoms in the presence of a catalyst formed by reacting (1) an inorganic compound selected from zinc oxide and zinc sulfide, (2) an amine selected from cyclohexylamine, N,N'-diethyl-aniline, alpha-naphthylamine; methyl amine and diethyl amine; and (3) a dialkyl compound of the formula $R_1$—Zn—$R_2$ where $R_1$ and $R_2$ represent lower alkyl groups, in a mole ratio of inorganic compound to amine to dialkyl compound between 1.0:0.002:0.02 and 1:0.6:1.

3. A process as in claim 1 wherein the cyclic ether is isobutylene oxide.

4. A process as in claim 1 wherein the temperature is from about 70 to about 140° C.

5. The process as in claim 1 wherein the ratio of inorganic compound to amine to dialkyl compound is between 1:0.002:0.02 and 1:0.6:1.

References Cited
UNITED STATES PATENTS

| | | | |
|---|---|---|---|
| 3,221,059 | 11/1965 | Fukui et al. | 260—615 |
| 3,230,207 | 1/1966 | Daimon et al. | 260—88.3 |
| 3,284,374 | 11/1966 | Daimon et al. | 260—2 |
| 3,296,152 | 1/1967 | Achon | 260—2 |
| 3,313,741 | 4/1967 | Velzmann et al. | 260—2 |
| 3,324,051 | 6/1967 | Lal | 260—2 |
| 3,383,333 | 5/1968 | Hsieh | 260—2 |
| 3,399,150 | 8/1968 | Miyoshi et al. | 260—2 |
| 3,448,064 | 6/1969 | Tomomatsu | 260—2 |
| 3,509,074 | 4/1970 | Kamio et al. | 260—2 |
| 3,598,765 | 8/1971 | Achon | 260—2 EP |

WILLIAM H. SHORT, Primary Examiner

E. A. NIELSEN, Assistant Examiner

U.S. Cl. X.R.

252—431 N; 260—47 EP, 88.3 A, 615 B